UNITED STATES PATENT OFFICE.

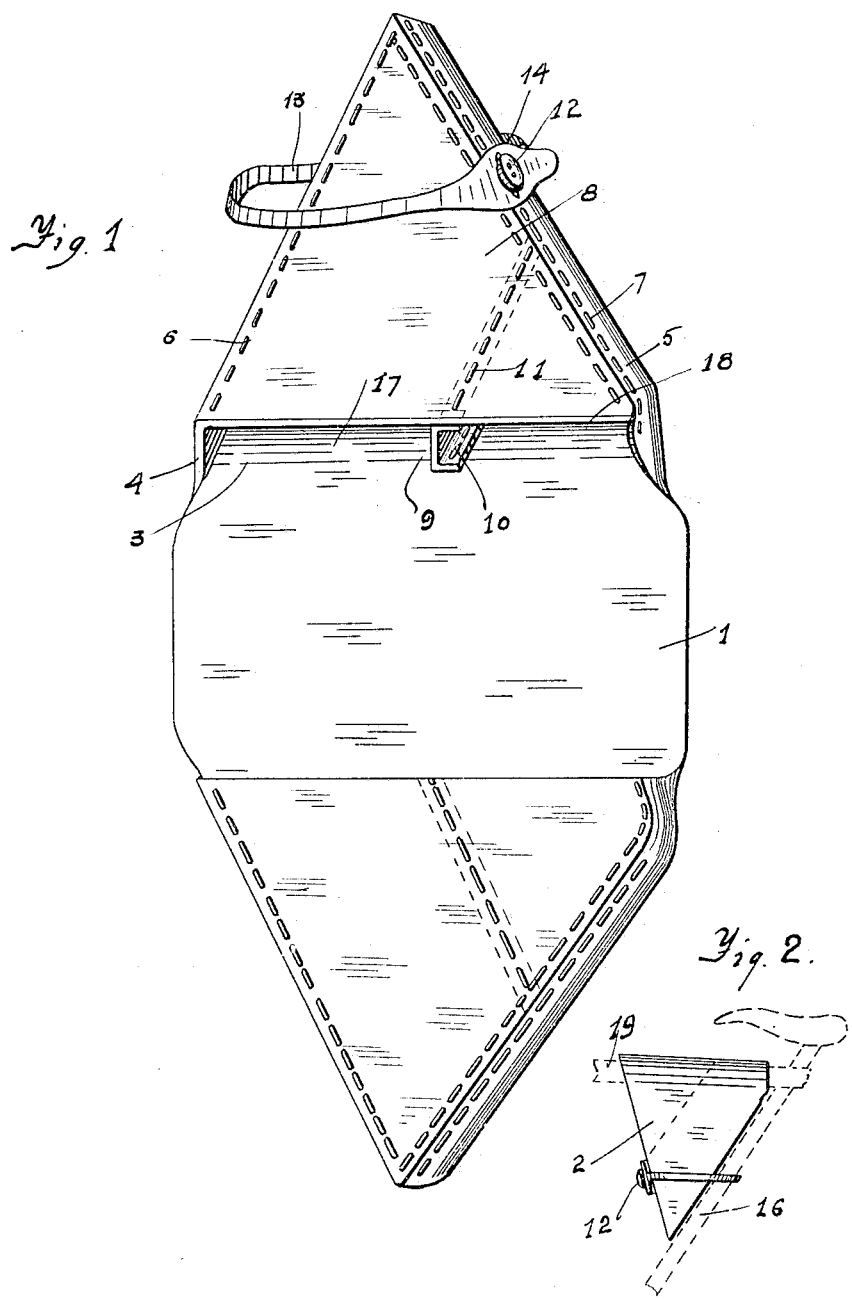

WILLIAM HURRELL, OF McKEESPORT, PENNSYLVANIA.

TOOL-CASE FOR BICYCLES.

1,121,366.  Specification of Letters Patent.  Patented Dec. 15, 1914.

Application filed June 24, 1914. Serial No. 847,057.

*To all whom it may concern:*

Be it known that I, WILLIAM HURRELL, a citizen of the United States of America, residing at McKeesport, in the county of Allegheny and State of Pennsylvania, have invented certain new and useful Improvements in Tool-Cases for Bicycles, of which the following is a specification, reference being had therein to the accompanying drawing.

This invention relates to a tool case for bicycles and has for its object to provide a case for such purpose, having means in a manner as hereinafter set forth, whereby it can be suspended from the reach bar of the frame and secured to the seat post for the purpose of detachably connecting the case to the bicycle frame.

A further object of the invention is to provide a tool case for bicycles having means in a manner as hereinafter set forth, providing a plurality of compartment receptacles capable of being folded upon themselves and further capable of being detachably connected to the bicycle frame.

Further objects of the invention are to provide a tool case for the purpose set forth which is simple in its construction and arrangement, strong, durable, efficient and convenient in its use, capable of being quickly secured to the bicycle frame and inexpensive to manufacture.

With the foregoing and other objects in view the invention consists of the novel construction, combination and arrangement of parts as hereinafter more specifically described and illustrated in the accompanying drawings, wherein is shown an embodiment of the invention, but it is to be understood that changes, variations and modifications can be resorted to which come within the scope of the claims hereunto appended.

In the drawings wherein like reference characters denote corresponding parts throughout the several views:—Figure 1, is an elevation of a tool case in accordance with this invention extended. Fig. 2, is an elevation of a case folded showing the adaption thereof in connection with a bicycle frame, the latter being illustrated in dotted lines.

Referring to the drawing in detail, 1 denotes a flexible coupling member, with a pair of triangular shaped extensions 2 and 3. Each of the extensions 2 and 3 constitutes the outer wall of a receptacle. Each of the extensions 2 and 3 has a flap projecting from each side thereof, as indicated at 4 and 5, and each of said flaps is bent at right-angles to form the side walls of a receptacle. The flaps 4 and 5 have connected thereto, by rows of stitching 6 and 7, a triangular-shaped member 8, which forms the inner wall of a compartment.

Interposed between the inner and outer walls of a receptacle, is a flanged inclined partition 9, which is secured to the walls 3 and 8 by rows of stitching 10 and 11. The partition 9, extends from the inner end of the flexible member 8 to the flap 5. The flap 5 which forms an end wall of one of the receptacles has secured thereto a button 12 and has further secured thereto one end of a strap 13, the latter having its other end enlarged as at 14, whereby the strap can be extended around the seat post 16, and then having its free end secured by the button 12, whereby the case can be connected to the seat post 16. The partition 10 divides each receptacle into a pair of compartments 17 and 18.

When the case is connected to a bicycle frame, the receptacles are folded one against the other, and the coupling member is positioned upon each bar 19 of a bicycle frame. The pair of receptacles depends from the reach bar 19 and abuts against the seat post 16. The strap 13 is then passed around the receptacles and seat post 16 and its free end secured through the medium of the button 12, as clearly illustrated in Fig. 2, under such conditions the case is detachably secured to the bicycle frame.

What I claim is:—

1. A tool case for the purpose set forth comprising a pair of triangular-shaped compartment receptacles, a flexible member connecting said receptacles together providing means whereby said receptacles can be folded against each other, and means carried by one of said receptacles and capable of connecting said receptacles together and further in connection with said coupling member detachably attaching the case to the frame of a bicycle.

2. A tool case for the purpose set forth comprising a pair of triangular-shaped receptacles, a flexible member connecting said receptacles together providing means whereby said receptacles can be folded against each other, and means carried by one of said receptacles and capable of connecting said receptacles together and further in connection with said coupling member detachably attaching the case to the frame of a bicycle.

3. A tool case for the purpose set forth comprising a pair of receptacles opened at their tops, a flexible coupling member connecting said receptacles together and providing means whereby said receptacles can be folded against each other, and further providing means whereby the receptacles can be suspended from the reach bar of a bicycle frame, and means carried by one of said receptacles and capable of extending around the seat post of a bicycle frame for maintaining said receptacles in abutting engagement and further in connection with said coupling member detachably connecting said receptacles to a bicycle frame.

In testimony whereof I affix my signature in the presence of two witnesses.

WILLIAM HURRELL.

Witnesses:
 MAX H. SROLOVITZ,
 MARIE H. ZBIERA.

Copies of this patent may be obtained for five cents each, by addressing the "Commissioner of Patents, Washington, D. C."